United States Patent
Sauerwein, Jr. et al.

(10) Patent No.: US 8,270,303 B2
(45) Date of Patent: Sep. 18, 2012

(54) USING METADATA TAGS IN VIDEO RECORDINGS PRODUCED BY PORTABLE ENCODED INFORMATION READING TERMINALS

(75) Inventors: James T. Sauerwein, Jr., Charlotte, NC (US); Aldo Mario Caballero, Charlotte, NC (US); Vincent Scott Garmon, Waxhaw, NC (US); Scott W. Reynolds, Concord, NC (US); Paul Weslake, Waxhaw, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1162 days.

(21) Appl. No.: 12/005,053

(22) Filed: Dec. 21, 2007

(65) Prior Publication Data
US 2009/0161994 A1 Jun. 25, 2009

(51) Int. Cl.
*H04B 1/66* (2006.01)
(52) U.S. Cl. ........................................... 370/240
(58) Field of Classification Search ............. 235/462.41; 375/240.18, 240
See application file for complete search history.

(56) References Cited

U.S. PATENT DOCUMENTS

| | | |
|---|---|---|
| 3,849,632 A | 11/1974 | Eckert, Jr. et al. |
| 3,969,612 A | 7/1976 | McJohnson |
| 4,044,227 A | 8/1977 | Holm et al. |
| 4,680,457 A | 7/1987 | Robertson |
| 5,053,956 A | 10/1991 | Donald et al. |
| 5,148,403 A | 9/1992 | Gardner et al. |
| 5,682,030 A | 10/1997 | Kubon |
| 5,699,262 A | 12/1997 | Lang et al. |
| 5,802,274 A | 9/1998 | Dorak et al. |
| 5,805,152 A | 9/1998 | Furusawa et al. |
| 5,918,211 A | 6/1999 | Sloane |
| 6,015,088 A | 1/2000 | Parker et al. |
| 6,106,457 A | 8/2000 | Perkins et al. |
| 6,133,908 A | 10/2000 | Scibora et al. |
| 6,141,042 A | 10/2000 | Martinelli et al. |
| 6,347,741 B1 | 2/2002 | Blanford et al. |
| 6,394,351 B1 | 5/2002 | Keys et al. |
| 6,512,919 B2 | 1/2003 | Ogasawara |
| 6,518,881 B2 | 2/2003 | Monroe |
| 6,556,273 B1 | 4/2003 | Wheeler et al. |
| 6,695,211 B2 | 2/2004 | Keys et al. |
| 6,697,794 B1 | 2/2004 | Milby |
| 6,697,805 B1 | 2/2004 | Choquier et al. |
| 6,746,164 B1 | 6/2004 | Albright et al. |
| 6,758,403 B1 | 7/2004 | Keys et al. |
| 6,764,009 B2 | 7/2004 | Melick et al. |
| 6,772,947 B2 | 8/2004 | Shaw |
| 6,775,602 B2 | 8/2004 | Gordon, Jr. et al. |

(Continued)

OTHER PUBLICATIONS

Austerberry, David. The Technology of Video and Audio Streaming, pp. 78-101, 149-177, 209-232, 2nd edition, 2005. ISBN 0-240-80580.

(Continued)

*Primary Examiner* — Kevin C Harper
(74) *Attorney, Agent, or Firm* — Heslin Rothenberg Farley & Mesiti P.C.

(57) ABSTRACT

A system and method for facilitating the video information search and users' navigation through multiple video image or video stream files, as well as reducing the amount of data transferred between a video content management server and a video playback client, by employing metadata tags inserted into the video recordings automatically or by an operator of an encoded information reading terminal.

43 Claims, 7 Drawing Sheets

U.S. PATENT DOCUMENTS

| | | |
|---|---|---|
| 6,827,259 B2 | 12/2004 | Rathus et al. |
| 6,834,807 B2 | 12/2004 | Ehrhart et al. |
| 6,851,610 B2 | 2/2005 | Knowles et al. |
| 6,908,034 B2 | 6/2005 | Alleshouse |
| 6,942,151 B2 | 9/2005 | Ehrhart |
| 6,959,235 B1 | 10/2005 | Abdel-Malek et al. |
| 7,104,453 B1 | 9/2006 | Zhu et al. |
| 7,111,787 B2 | 9/2006 | Ehrhart |
| 7,121,469 B2 | 10/2006 | Dorai et al. |
| 7,434,226 B2 | 10/2008 | Singh |
| 7,526,812 B2 | 4/2009 | DeYoung |
| 7,543,748 B2 | 6/2009 | Kiliccote |
| 7,571,857 B2 | 8/2009 | Payne et al. |
| 7,571,859 B2 | 8/2009 | Knowles et al. |
| 7,577,516 B2 | 8/2009 | Dobeck et al. |
| 7,685,428 B2 | 3/2010 | Piersol |
| 7,712,670 B2 | 5/2010 | Sauerwein, Jr. et al. |
| 7,734,093 B2 | 6/2010 | Wolff et al. |
| 7,779,355 B1 | 8/2010 | Erol et al. |
| 7,853,766 B2 | 12/2010 | Lindner et al. |
| 7,970,738 B2 | 6/2011 | Wolff et al. |
| 8,014,665 B2 | 9/2011 | Clifton et al. |
| 8,043,156 B2 | 10/2011 | Ackley et al. |
| 8,073,795 B2 | 12/2011 | Honisch |
| 8,090,462 B2 | 1/2012 | Wininger et al. |
| 2001/0011233 A1 | 8/2001 | Narayanaswami |
| 2001/0016825 A1 | 8/2001 | Pugliese et al. |
| 2001/0032202 A1 | 10/2001 | Seese et al. |
| 2002/0036565 A1 | 3/2002 | Monroe |
| 2002/0065728 A1 | 5/2002 | Ogasawara |
| 2002/0093633 A1 | 7/2002 | Milch |
| 2002/0117548 A1 | 8/2002 | Keys et al. |
| 2002/0128790 A1 | 9/2002 | Woodmansee |
| 2002/0172498 A1 | 11/2002 | Esenyan et al. |
| 2003/0004397 A1 | 1/2003 | Kameya et al. |
| 2003/0009350 A1 | 1/2003 | Melick et al. |
| 2003/0043040 A1 | 3/2003 | Zeps et al. |
| 2003/0043041 A1 | 3/2003 | Zeps et al. |
| 2003/0043042 A1 | 3/2003 | Moores et al. |
| 2003/0154133 A1 | 8/2003 | Furon et al. |
| 2003/0160101 A1 | 8/2003 | Wiedenhoefer |
| 2003/0171096 A1 | 9/2003 | Ilan et al. |
| 2004/0015278 A1 | 1/2004 | Gordon et al. |
| 2004/0096123 A1 | 5/2004 | Shih et al. |
| 2004/0125077 A1 | 7/2004 | Ashton |
| 2004/0155109 A1 | 8/2004 | Kenney et al. |
| 2004/0155783 A1 | 8/2004 | Al-Sheikh |
| 2004/0172327 A1 | 9/2004 | Falk |
| 2004/0206820 A1 | 10/2004 | Melick et al. |
| 2005/0171661 A1 | 8/2005 | Abdel-Malek et al. |
| 2005/0237557 A1 | 10/2005 | Ferlitsch |
| 2005/0258246 A1 | 11/2005 | Wolff et al. |
| 2005/0259289 A1 | 11/2005 | Ferlitsch et al. |
| 2005/0286463 A1 | 12/2005 | Matsumoto |
| 2006/0006995 A1 | 1/2006 | Tabankin et al. |
| 2006/0026684 A1 | 2/2006 | Harvey et al. |
| 2006/0043193 A1 | 3/2006 | Brock |
| 2006/0053088 A1 | 3/2006 | Ali et al. |
| 2006/0074769 A1 | 4/2006 | Looney et al. |
| 2006/0094949 A1 | 5/2006 | Coonce et al. |
| 2006/0095950 A1 | 5/2006 | Coonce et al. |
| 2006/0120607 A1 | 6/2006 | Lev |
| 2006/0124744 A1 | 6/2006 | Gormish et al. |
| 2006/0185611 A1 | 8/2006 | Copeland et al. |
| 2006/0196950 A1 | 9/2006 | Kiliccote |
| 2006/0206245 A1 | 9/2006 | Camper et al. |
| 2006/0215023 A1 | 9/2006 | Coonce et al. |
| 2006/0263789 A1 | 11/2006 | Kincaid |
| 2006/0265590 A1 | 11/2006 | DeYoung et al. |
| 2007/0033109 A1 | 2/2007 | Patten et al. |
| 2007/0047816 A1 | 3/2007 | Graham et al. |
| 2007/0124278 A1 | 5/2007 | Lew, Jr. et al. |
| 2007/0176000 A1 | 8/2007 | Cattrone et al. |
| 2007/0177824 A1 | 8/2007 | Cattrone et al. |
| 2007/0225931 A1 | 9/2007 | Morse et al. |
| 2007/0226258 A1 | 9/2007 | Lambdin et al. |
| 2007/0226321 A1 | 9/2007 | Bengtson |
| 2007/0273774 A1 | 11/2007 | Holmes |
| 2008/0027983 A1 | 1/2008 | Erol et al. |
| 2008/0039206 A1 | 2/2008 | Ackley et al. |
| 2008/0052205 A1 | 2/2008 | Dolley et al. |
| 2008/0133295 A1 | 6/2008 | Cappel et al. |
| 2008/0144116 A1 | 6/2008 | Pauly et al. |
| 2008/0163364 A1 | 7/2008 | Ferlitsch |
| 2008/0170775 A1 | 7/2008 | Pasupuleti et al. |
| 2008/0183852 A1 | 7/2008 | Pramer et al. |
| 2008/0247629 A1 | 10/2008 | Gilder et al. |
| 2008/0272585 A1 | 11/2008 | Conard et al. |
| 2009/0026270 A1* | 1/2009 | Connell et al. ............ 235/462.41 |
| 2009/0218262 A1 | 9/2009 | Bowers et al. |
| 2009/0238626 A1 | 9/2009 | Ming et al. |
| 2009/0292930 A1 | 11/2009 | Marano et al. |
| 2010/0065636 A1 | 3/2010 | Byun et al. |
| 2010/0071003 A1 | 3/2010 | Bychkov et al. |
| 2010/0075292 A1 | 3/2010 | DeYoung et al. |
| 2010/0076976 A1 | 3/2010 | Sotirov et al. |
| 2010/0088123 A1 | 4/2010 | McCall et al. |
| 2010/0155479 A1 | 6/2010 | Ming |
| 2010/0157318 A1 | 6/2010 | Ming |
| 2010/0177212 A1 | 7/2010 | Holmes |
| 2010/0179857 A1 | 7/2010 | Kalaboukis et al. |
| 2010/0217723 A1 | 8/2010 | Sauerwein, Jr. |
| 2010/0228387 A1 | 9/2010 | Bowers et al. |
| 2010/0314443 A1 | 12/2010 | Cudzilo |
| 2011/0058187 A1 | 3/2011 | Smith et al. |
| 2011/0066281 A1 | 3/2011 | Ksiazek |
| 2011/0079639 A1 | 4/2011 | Khan |
| 2011/0107370 A1 | 5/2011 | Cassanova et al. |
| 2011/0121066 A1 | 5/2011 | Tian et al. |
| 2011/0282733 A1 | 11/2011 | Gnanasambandam et al. |
| 2011/0282942 A1 | 11/2011 | Berger et al. |

OTHER PUBLICATIONS

U.S. Appl. No. 12/889,764, filed Sep. 24, 2010.
U.S. Appl. No. 12/892,477, filed Sep. 28, 2010.

* cited by examiner

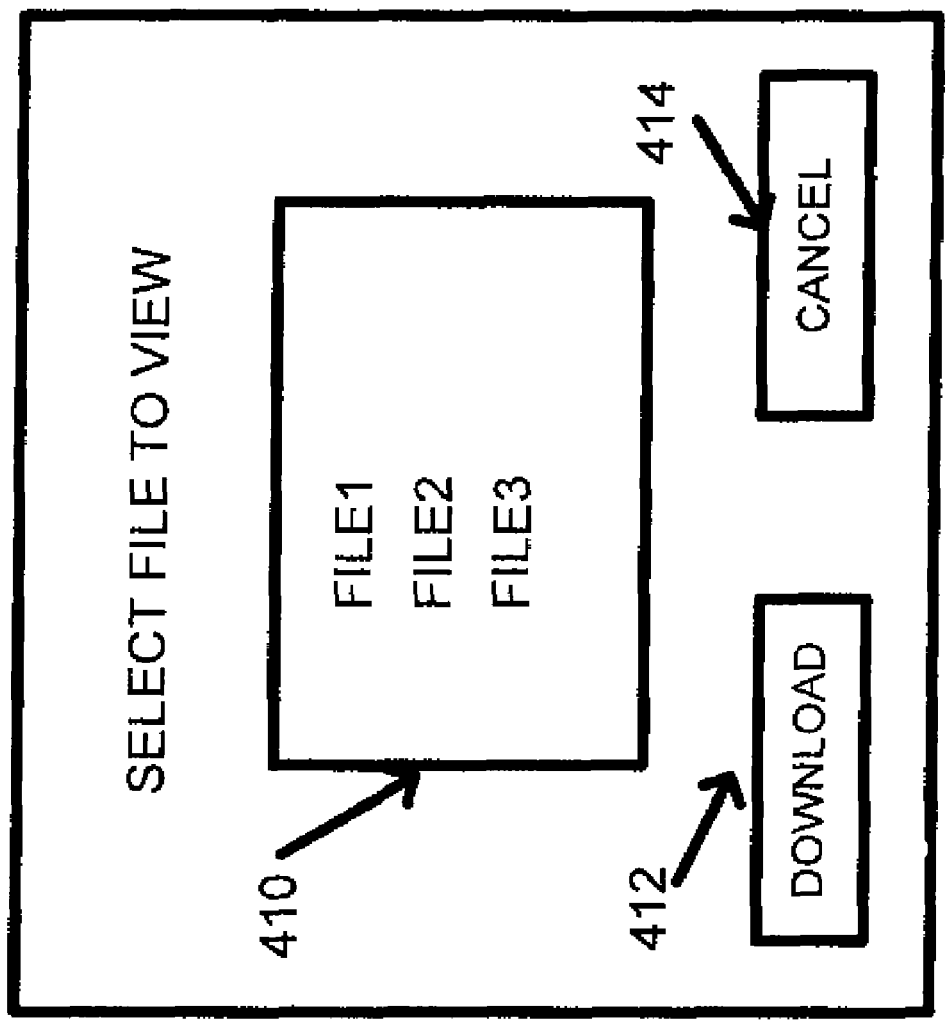

USING METADATA TAGS IN VIDEO RECORDINGS PRODUCED BY PORTABLE ENCODED INFORMATION READING TERMINALS

FIELD OF THE INVENTION

This invention relates generally to portable encoded information reading (EIR) terminals that are capable of video capturing and recording, and more specifically to employing metadata tags inserted into a video file for facilitating video information search, retrieval, and processing.

BACKGROUND OF THE INVENTION

Encoded information reading (EIR) terminals equipped with two-dimensional image sensors and wireless communication interfaces are widely used in retail stores, shipping facilities, etc. A portable EIR terminal having a two-dimensional image sensor can be capable of capturing still two-dimensional images of objects and transferring them to a remote host computer via a wireless communication interface.

SUMMARY OF THE INVENTION

A system and method for facilitating the video information search and users' navigation through multiple video image or video stream files, as well as reducing the amount of data transferred between a video content management server and a video playback client, by employing metadata tags inserted into the video recordings automatically or by an operator of an encoded information reading terminal.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIGS. 4*a*-4*c* illustrate a sample user interface according to the invention, allowing an EIR operator to perform video database search using the tags of the video stream being recorded at the time of compiling the video file search request, as the search condition parameter values.

DETAILED DESCRIPTION OF THE INVENTION

There is provided herein a data collection system including one or more encoded information reading (EIR) terminals having two-dimensional (2D) imagers capable of capturing 2D image frames, a video content management server, and a video database. In one aspect, an EIR terminal can communicate with the video content management server over a wireless or wired (e.g., via a docking station connected to the local network) link. In another aspect, an EIR terminal can have a cellular network (e.g., GPRS) interface.

An EIR terminal can further comprise one or more information input devices including, e.g., an EIR device, a Global Positioning System (GPS) receiving device, a voice recognition module, a real time clock, a light sensor, a biometric information input device. The EIR device can be represented by a bar code reading device, an RFID reading device, a smart card reading device, or any combination thereof. The GPS module can acquire the terminal's current geographic coordinates. The voice recognition module can be capable of converting voice to text. The real-time clock can be capable of outputting the current date and time. The light sensor can be capable of measuring the ambient light luminous intensity. The biometric information input device can be provided, e.g, by a fingerprint scanner. The biometric information input device can be used, e.g., for identifying the terminal operator.

Figure 1:
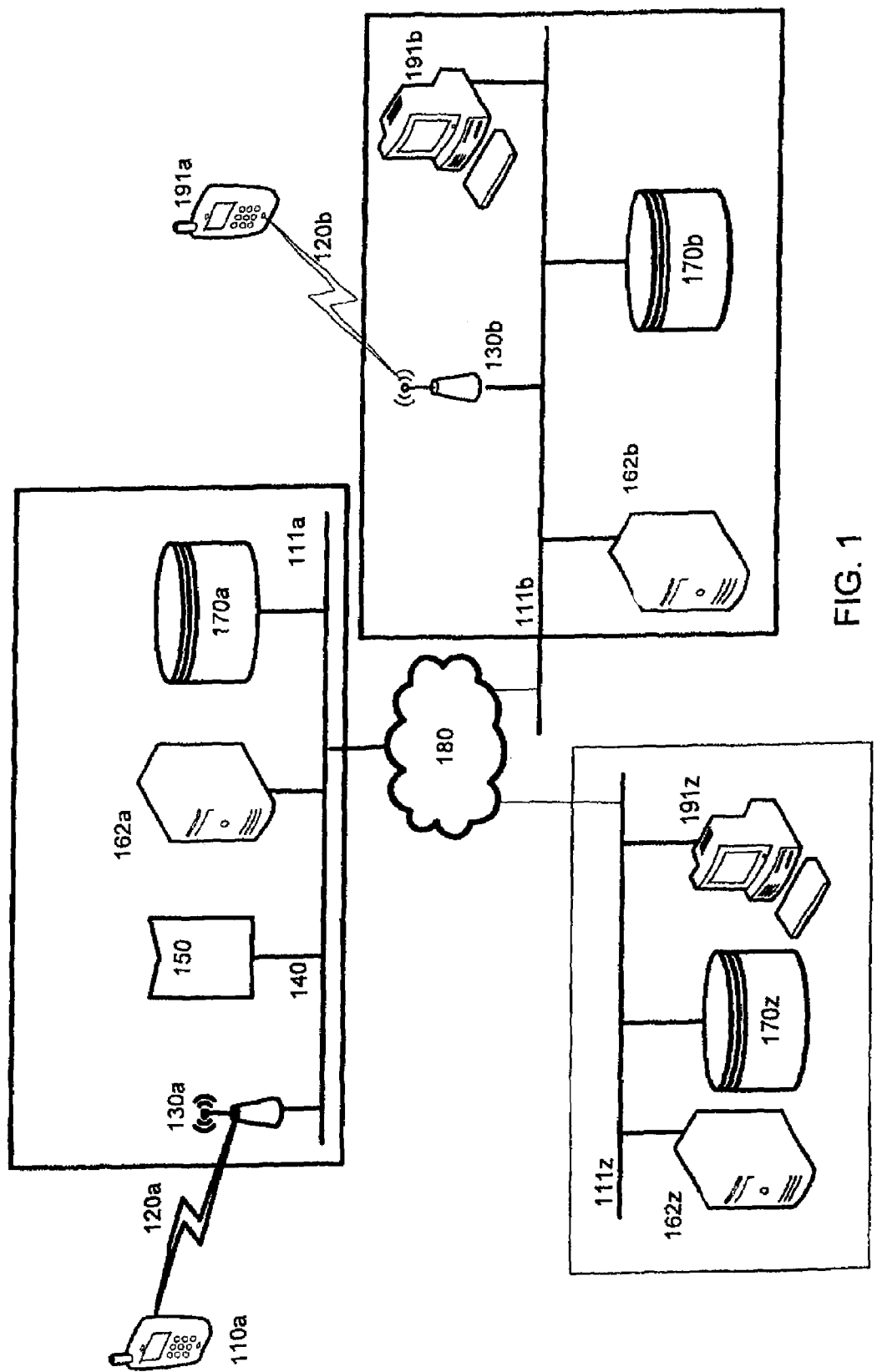
FIG. 1 shows a high level overview of one embodiment of a data collection system employing portable EIR terminals capable of inserting metadata tags into the captured video stream according to the invention.

Referring now to the drawings, a high level overview of one embodiment of a data collection system employing at least one portable EIR terminal capable of inserting metadata tags into the captured video file is shown in FIG. 1. In accordance with this embodiment, the EIR terminal can be capable of capturing a sequence of image frames and converting it into a formatted video stream, which can be transferred to an external server, e.g., via a wired or wireless communication interface. An EIR terminal operator can point the imager lens towards an object to be video recorded, and start the video recording mode by issuing a user interface command (e.g., by pressing a button). The video frames captured by the terminal can be converted into one of the standard or proprietary image or video stream formats. Metadata tags can be created and inserted into the formatted image frame or video stream at the time of the recording or immediately thereafter, automatically by the terminal software, or by the operator of the portable EIR terminal 110*a*.

In one embodiment, one or more metadata tags can be written into the video file provided by a formatted image frame or a video stream. In another embodiment, one or more metadata tags can be stored in a data file different from the video file. The data file can be, e.g., an XML file, or a text file.

Figure 2A:
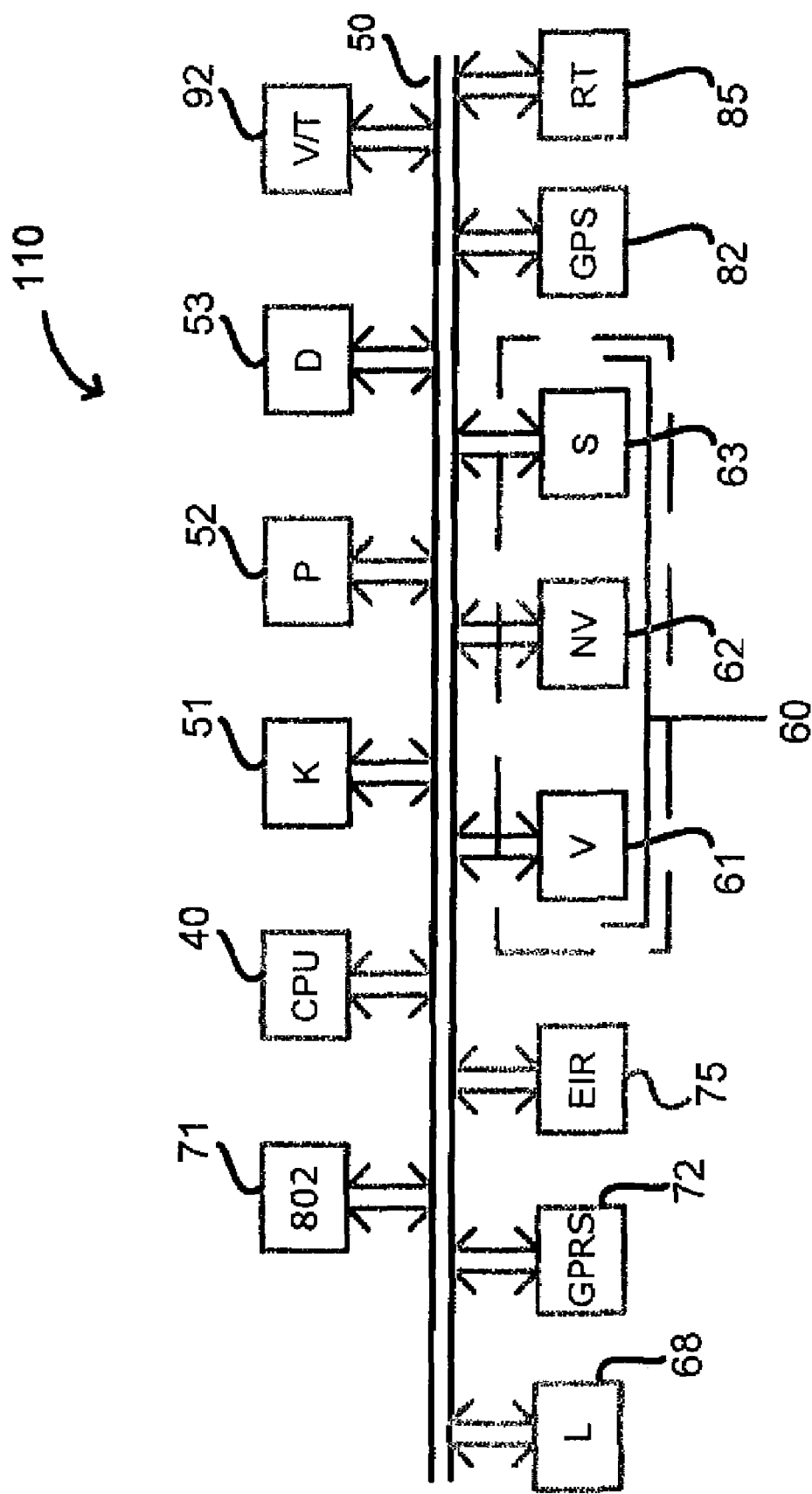
FIG. 2*a* illustrates a block diagram of an EIR terminal according to the invention.

FIG. 2*a* illustrates a block diagram of an EIR terminal suitable to practice the present invention. An EIR terminal 110 can include a central processing unit (CPU) 40 in communication with various user input devices such as a keyboard 51, pointer controller 52, and output devices such as a display 53. Such input and output devices can be in communication with CPU 40 via a system bus 50. Also in communication with CPU 40 via system bus 50 can be a memory 60. Memory 60 can comprise a combination of one or more volatile memory devices 61, one or more non-volatile memory devices 62 and one or more long term storage devices 63.

An EIR terminal 110 can further include one or more communication interfaces 71, 72. In one aspect, an EIR terminal can have an IEEE-802.11x-conformant wireless network interface. In another aspect, an EIR terminal can further have a cellular network (e.g., GPRS) interface. An EIR terminal can be capable of switching to the cellular network interface when no wireless access points are detected within the wireless communication range. In a further aspect, an EIR terminal can have a wired (e.g., Ethernet) network interface.

Further in communication with CPU 40 can be an EIR device 75. In one aspect, the EIR device 75 can be a bar code reading device, and can be provided by the IT4XXX/5XXX imaging module that has a decode out circuit of the type available from Hand Held Products, Inc. (Skaneateles Falls, N.Y.). The IT4XXX/5XXX imaging module with a decode out circuit provides decoding of a plurality of different types of bar code symbols and other decodable symbols such as PDF 417, Micro PDF 417, Maxicode, Data Matrix, QR Code, Aztec, Aztec Mesa, Code 49, UCC Composite, Snowflake, Data Gliffs, Code 39, Code 128, Codabar, UPC, EAN, Interleave 205, RSS, Code 93, Codablock, BC412, Postnet, Planet Code, BPO Forcedate, Canadian Forcedate, Japanese Post, KIX (Dutch Post), OCR A, OCR B, and any combinations thereof. In another example, EIR device 75 can be an RFID reading device, such as the Skytek Sky Module M1 reading device and Sky Module M8 reading device. In the case of a bar code reading device, EIR device 75 can scan the contents of, for example, a bar code. In another example, EIR device 75 can be a card reading device such as the Panasonic ZU-9A36CF4 integrated circuit smart card (IC CARD) reading device. In a yet another example, EIR device 75 can be any combinations of bar code reading device, RFID reading device, and card reading device.

In one embodiment, the EIR device can be capable of outputting decoded message data corresponding to an encoded message. In another embodiment, the EIR device can output raw message data containing an encoded message, e.g., raw image data or raw RFID data, to be processed by the CPU 40.

The EIR device 75 can include a 2D imager (not shown in FIG. 2*a*) capable of capturing one or more image frames. The imager can be characterized by the imager type (e.g., the manufacturer's part number). In one embodiment, an EIR terminal can include a lens assembly which optically focuses an image (e.g., of a bar code symbol) onto the 2D imager. The lens assembly can be characterized by the focal length, which is a measure of how strongly the lens assembly focuses the light. In one embodiment, the EIR device 75 can be configured to process one or more video frames for determining decoded message data.

An EIR terminal can further include a GPS receiving module 82 in communication with CPU 40 for acquiring the terminal's current geographic coordinates. The terminal's current geographic coordinates can be converted into a valid street address by querying a geo-informational database. In one embodiment, the geo-informational database can reside on a remote computer. In another embodiment, the geo-informational database can reside locally on the EIR terminal.

An EIR terminal can further include a voice recognition module 92 in communication with CPU 40. The voice recognition module can be implemented as a software module running on the CPU 40, or using a specialized digital signal processing chip. The voice recognition module 92 can convert a voice input received from a microphone installed on the EIR terminal (not shown) into text.

An EIR terminal can further include a real-time clock 85 in communication with CPU 40. The real-time clock can be capable of outputting the current date and time. In another aspect, the real-time clock can be automatically adjustable via one of the terminal's communication interfaces, and/or manually adjustable by the terminal's operator.

As indicated by generic information input device 89, an EIR terminal can include an information input device in addition to the device 75, device 82, and device 92. The generic information input device 89 can be, e.g., a biometric information input device provided by, e.g., a fingerprint scanner.

In one embodiment, an EIR terminal can further include a light sensor 68 measuring the ambient light luminous intensity.

Figure 2D:
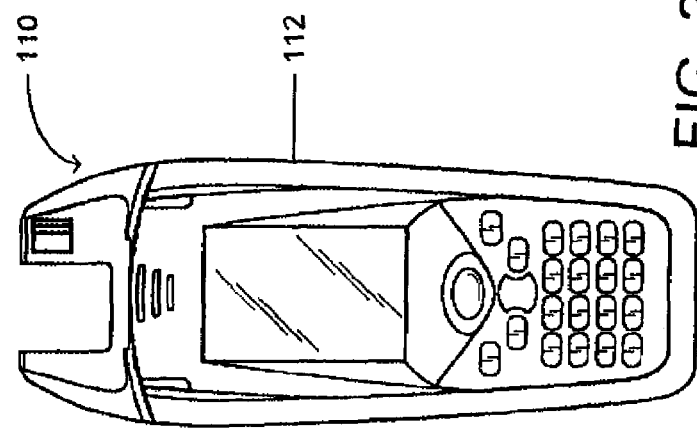
FIGS. 2*b*, 2*c* and 2*d* illustrate various types of EIR terminals suitable for use according to the invention.
Figure 2B:
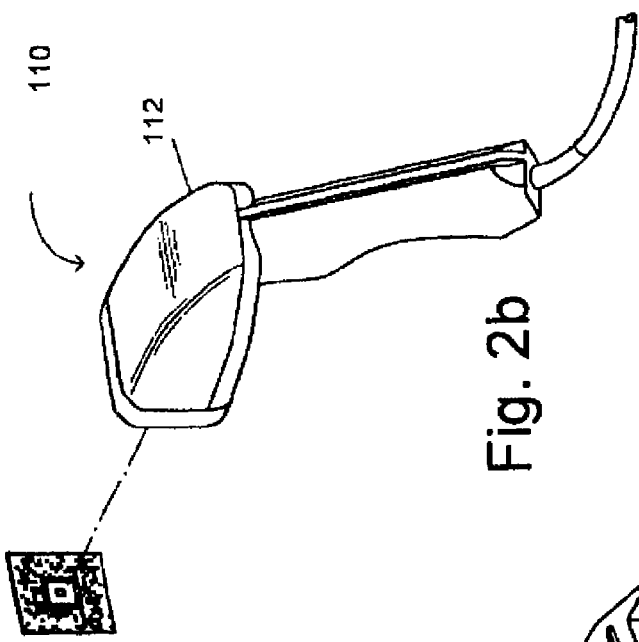
Figure 2C:
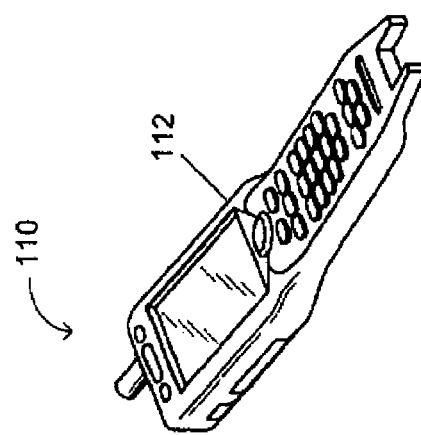

An EIR terminal 110 can be incorporated in a hand held housing 112. FIGS. 2*b*, 2*c*, and 2*d* illustrate various types of EIR terminals suitable for use according to the present invention. FIG. 2*b* shows a perspective view of a hand held 2D bar code reading terminal imaging a 2D bar code. FIG. 2*c* shows a mobile computer having an integral 2D bar code reading terminal. FIG. 2*d* shows yet another style of portable bar code reading terminal having an integral display and keyboard. A skilled artisan would appreciate the fact that any suitable EIR terminal physical form factor can be used to practice the present invention.

An EIR terminal can be capable of capturing 2D image frames. In one aspect, the EIR terminal can convert one or more captured image frames into a standard or proprietary video image format, e.g., JPEG, GIF, TIFF, or PNG, and transmit the resulting video image file to a video content management server. In a further aspect, the EIR terminal can transmit to the video content management server a sequence of one or more consecutively captured image frames formatted into one or more video image files. Analyzing two or more consecutively captured image frames can be useful, e.g., for detecting operator or target movement during the image exposure.

In a further aspect, the EIR terminal can convert the captured image frames into a video stream of a standard or proprietary format, e.g., MJPEG, MPEG-4, RealVideo, or WMV format, and transmit the resulting video stream file to a video content management server.

In another aspect, the EIR terminal can store in its memory the imaging parameters (e.g., the exposure level, the depth of field, the frame rate) corresponding to one or more captured image frames.

In another aspect, the EIR terminal can create one or more metadata tags and insert them into the formatted video frames or video stream at the time of the recording or immediately thereafter, automatically by the terminal software, or by an operator of the EIR terminal. Metadata tags can be inserted into one or more frames (frame level metadata tags) or into the formatted video stream (file level metadata tags). The resulting one or more video frames or formatted video stream can be uploaded by the originating EIR to a video content management server.

In one aspect, the automatically created metadata tags can include the values inputted by the EIR terminal input devices, e.g., GPS coordinates captured by the GPS module 82, a street address derived from the GPS coordinates, a decoded message data produced by an EIR device, a time stamp produced by the real-time clock 85, the ambient light luminous intensity, a biometric information produced by the biometric information input device, or any combination thereof. In another aspect, the automatically created metadata tags can include the imaging parameters (e.g., the imager type, the focal length of the lens assembly, the exposure level, the depth of field, the frame rate, or any combination thereof) corresponding to one or more frames (frame level metadata tags), or to the formatted video stream (file level metadata tags). In a further aspect, one or more automatically created metadata tags can be inserted into the video file responsively to a user interface action.

The metadata tags created by an operator of the EIR terminal can include, e.g., one or more text strings manually entered by the operator of the EIR terminal via a user interface, or one or more text strings representing voice commands issued by the EIR terminal operator. The text strings representing voice commands can be produced by the voice recognition module 92 converting operator's speech to text.

In another aspect, file level or frame level metadata tags can include one or more metadata tags outputted by an EIR terminal's information input device (e.g., an EIR device, a GPS module, a voice recognition module, an ambient light luminous intensity sensor, a real-time clock, or a biometric information produced by the biometric information input device), and one or more metadata tags created by the EIR terminal operator (e.g., one or more text strings manually entered by the terminal operator via a user interface, or one or more text strings produced by the voice recognition module and representing voice commands issued by the terminal operator).

In another aspect, the metadata tags can be represented by the values of the respective inputs converted into a standard or proprietary metadata format (e.g., MPEG-7 Multimedia Content Description Interface standard by the MPEG Working Group, or Unique Material Identifier (UMID) by The Society of Motion Picture and Television Engineers (SMPTE)). A skilled artisan would appreciate the fact that other metadata formats are within the spirit and the scope of the invention.

In another aspect, the values of one or more metadata tags can be converted into textual form to produce human readable text (e.g., subtitles) which can be inserted into one or more video frames.

In another aspect, an EIR terminal can have a display and be capable of running a video playback software application. An EIR terminal can download one or more video files from a video content management server. In another aspect, an EIR terminal can be capable of accepting operator's input via a user input device, e.g., a keyboard.

In another aspect, a recording EIR terminal, a video content management server, a video playback client, or any combination thereof can monitor a tagged sequence of video frames or video stream, and perform specified actions triggered by satisfying pre-defined conditions.

Referring again to FIG. 1, a video file, e.g., a video image file or a video stream file, containing the metadata tags can be uploaded by the video recording terminal 110*a* to one or more servers 162*a*-162*z* residing on a local network 111*a* or on a remote network 111*b*-111*z*. The file upload can be performed using, e.g., FTP, HTTP, or any other suitable application-level protocol. The video capturing terminal 110*a* can access the networks 111*a*-111*z* over a wireless communication link 120*a* via an optional wireless access point 130*a*, or over a wired communication link 140*a* (e.g., when the terminal is engaged to a docking station 150*a*). In another aspect, an EIR terminal can be capable of splitting a video file into one or more portions which can be uploaded to one or more servers using one or more EIR terminal's communication interfaces.

One of the video content management servers 162*a*-162*z*, upon receiving the video file from the video capturing terminal 110*a*, can store the file in one or more video databases 170*a*-170*z*. A video database can store a plurality of video files. Each of the video files can contain one or more video images or formatted video streams.

In one embodiment, the video database 170*a*-170*z* can be collocated with the respective video content management server 162*a*-162*z*. In another embodiment, the video database 170*a*-170*z* can run on a separate computer.

In one embodiment, the video database can be implemented using a relational database technology. To facilitate information search and retrieval, the video database content can be indexed using the metadata tags inserted into the video files.

Figure 3:
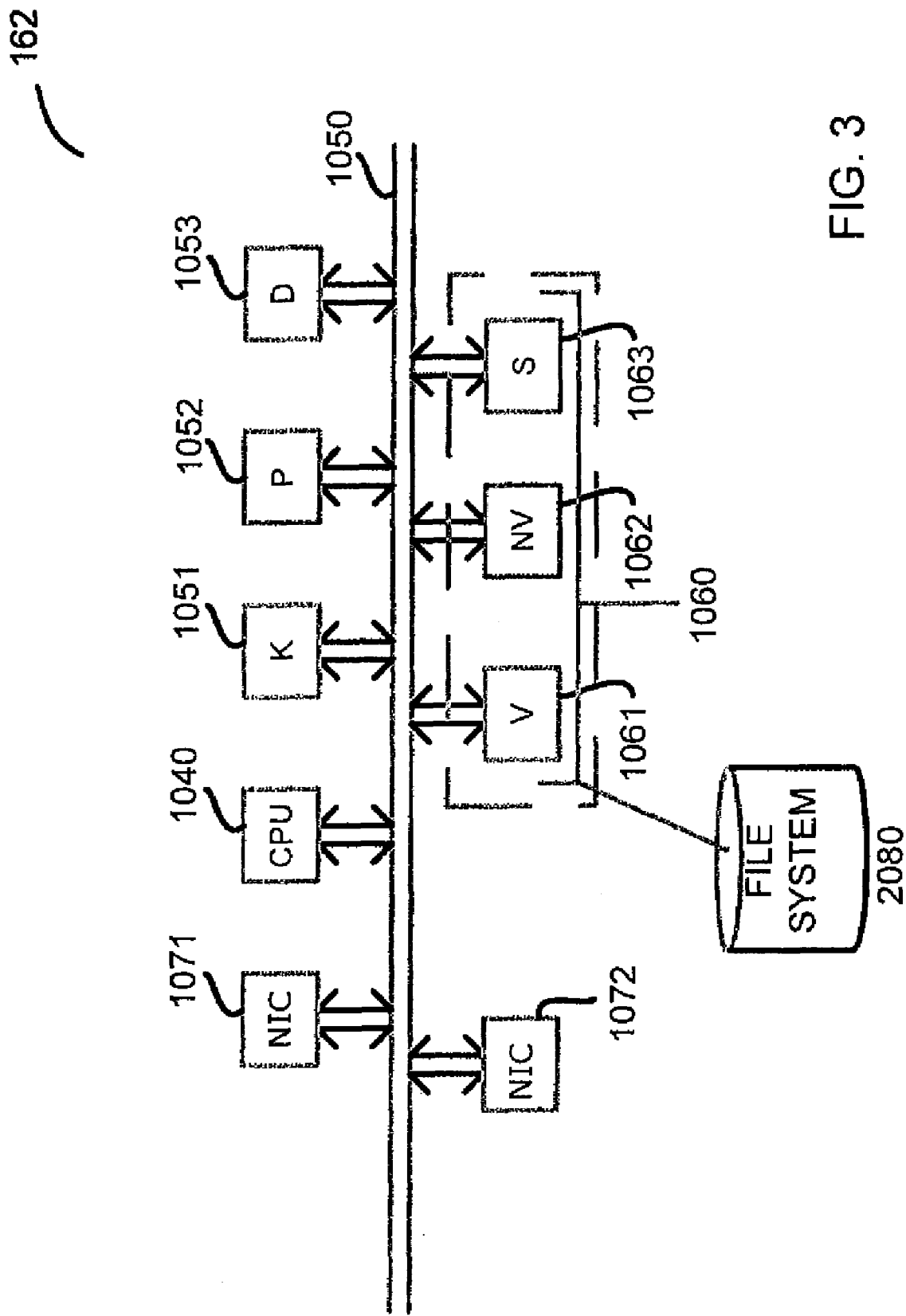
FIG. 3 illustrates a block diagram showing an exemplary embodiment of a video content management server according to the invention.

A block diagram illustrating an exemplary embodiment of the video content management server 162 is shown in FIG. 3. In one embodiment, the server 162 can be implemented as a computer that can have a memory 1060 including a combination of one or more volatile and non-volatile storage devices 1061, 1062, 1063, and a CPU 1040 in communication with memory 1060 via a system bus 1050. Server 162 can further have one or more communication interfaces 1071, 1072. Server 162 can further include user interface components such as a display 1053, a pointer controller 1052, and a keyboard 1051. Server 162 can be adapted to run a graphical user interface wherein a user can select various displayed buttons on the display 1053 using the pointer controller 1052.

In another embodiment (not shown in FIG. 3), the server 162 can be implemented as two or more computers, where each of the computers can include a CPU, a memory, a system bus, and one or more communication interfaces.

Video files stored in the video database 170 can be accessed and/or retrieved, partially or entirely, by the server 162*a*-162*z* responsive to a request by a video playback client 110*a*-110*z*, 191*a*-191*z*. In one embodiment, a video playback client can be provided by a video playback software application running on a portable computer 110 (e.g., a PDA or a portable EIR terminal equipped with a display). In another embodiment, a video playback client can be provided by a video playback software application running on a personal computer 191 which can connect to the video content management server 162 over a LAN or a WAN 180. In another aspect, the video playback software application can be provided by an HTML browser rendering one or more dynamic HTML pages downloadable from a video content management server and containing one or more data input fields.

In one embodiment, the video content management server 162 can reside on the local data collection network 111*a*. In another embodiment, the video content management server can reside on a remote network 111*b*-111*z* and access the video database 170*a* over a WAN.

In one aspect, the video playback software application executed by a video playback client device (e.g., a portable EIR terminal equipped with a display, a PDA, or a personal computer) can be capable of transmitting a video file search request to a video content management server. In another aspect, a video file search request can be transmitted to a video content management server responsive to a user interface action by an operator of the video playback client device. In another aspect, a video file search request can be transmitted to a video content management server in a fully automated mode, e.g., responsive to executing a software program instruction which can evaluate a condition (e.g., successful decoding of an encoded message data by an EIR device being part of the video playback client device can trigger automatic submission of a video file search request for images with metadata tags containing same or similar decoded message data).

In another aspect, an EIR terminal operator can enter the video file search conditions to initiate the video database search for images taken by same or other EIR terminals, using one or more search conditions including parameter values determined utilizing output of one or more EIR terminal information input devices, e.g., decoded message data outputted by the terminal's EIR device, or current GPS coordinates of the terminal, thus minimizing the amount of the information required to be inputted by the user.

For example, a video playback software application executed by an EIR terminal can, responsive to a terminal operator input or in a fully automated mode, transmit to a video content management server a search request for the list of video files previously recorded at the present location of the EIR terminal, using the current GPS data, optionally mapped to a valid address using a geo-informational database. This functionality can be useful, e.g., in the context of parcel delivery. In another example, a video playback software application executed by an EIR terminal can, responsive to a terminal operator input or in a fully automated mode, transmit to a video content management server a search request for the list of video files tagged with a decoded message identical to that of the last bar code read by the terminal. The bar code label can be attached, e.g., to an item being delivered, or to a hospital patient's chart. In another example, a video playback software application executed by an EIR terminal can, responsive to a terminal operator input or in a fully automated mode, transmit to a video content management server a search request for the list of video files tagged with an RFID identifier identical to the last RFID tag read by the terminal. The RFID tag can be attached, e.g, to an item being delivered, or to a hospital patient's chart.

In another aspect, a video playback software application executed by an EIR terminal can, responsive to a terminal operator input or in a fully automated mode, transmit to a video content management server a search request for the list of images taken by same or other EIR terminals, using one or more search conditions including imaging parameters (e.g., the exposure level, the depth of field, the frame rate) as search parameter values.

In a further aspect, a video file search request can comprise one or more search conditions represented by <parameter name><RELATIONSHIP><value> triplets separated by Boolean operators (e.g., AND or OR), wherein the RELATIONSHIP can be one of "equal", "less than", "more than", optionally preceded by the Boolean operator NOT. In one aspect, the search condition parameters can include one or more video file metadata tags, e.g., GPS coordinates, decoded message data, etc. In another aspect, the search condition parameters can include one or more values determined utilizing output of the EIR terminal information input devices, e.g., GPS coordinates, decoded message data, etc. In utilizing the output of an EIR information input device to produce a parameter value, the EIR terminal can, e.g., use the current outputted value, or establish a range of values about the current outputted value, or use a value derived from the current outputted value using a pre-defined method of formula (e.g., a street address derived from GPS coordinates, or a tagged item attribute derived from an RFID or bar code decoded message data).

In another aspect, the search condition parameters can include one or more imaging parameters, (e.g., the exposure level, the depth of field, the frame rate) corresponding to one or more image frames. In another aspect, the search condition parameters can further include video file properties, e.g., the file size, the file creation date, etc.

Figure 4A:
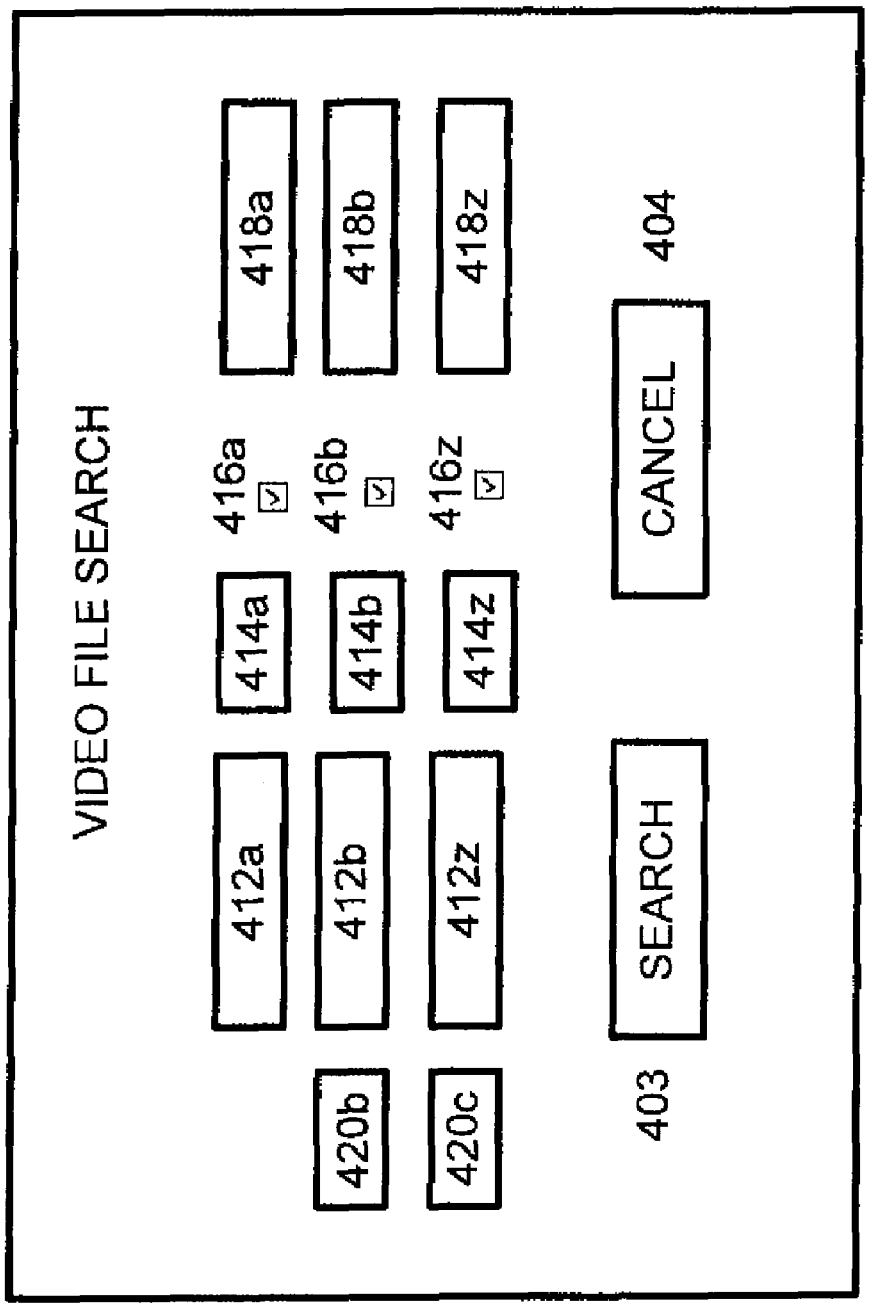

In another aspect, the video file search request parameters can be inputted by the operator of the video playback client device (e.g., a portable EIR terminal equipped with a display, a PDA, or a personal computer). FIG. 4a illustrates an exemplary embodiment of a user interface allowing an EIR terminal operator to specify one or more video file search conditions. To specify a condition, the operator needs to select a metadata tag type (e.g., GPS coordinates, decoded message data outputted by an EIR device, text, etc.) from the respective drop-down list 412a-412z. Upon selecting the metadata tag type, the operator can select a relationship (e.g., "equal", "less than", "more than", optionally preceded by the logical operator NOT) from the respective drop-down list 414a-414z. Then, the operator can either select the respective check box 416a-416z which would automatically fill in the parameter value field with the current value determined utilizing output of the selected EIR information input device (e.g., GPS coordinates).

Alternatively, the operator can manually input the parameter value into the respective input field 418a-418z using, e.g., a keyboard. If more than one search conditions need to be inputted, each subsequent search condition can be preceded by a logical operator AND or OR selectable by the operator from the respective drop-down list 420b-420z. A skilled artisan would appreciate the fact that other types and layouts of the user interface are within the scope and the spirit of the invention.

The operator can complete the input of the search conditions by pressing the Search button 403, or cancel the operation by pressing the Cancel button 404. Responsive to receiving the operator input, the video playback software application can compile a video file search request including one or more search conditions specified by the operator, and transmit the search request to a video content management server.

Figure 4B:
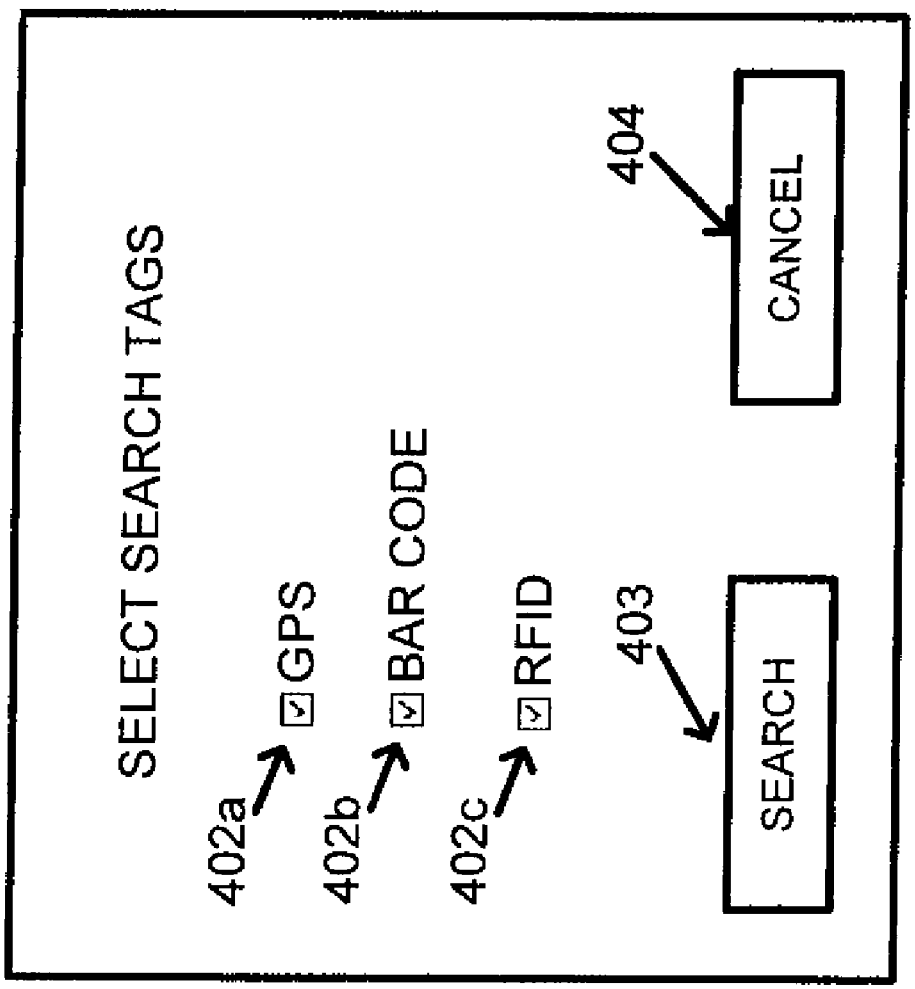

In another example, shown in FIG. 4b, the user interface can prompt an EIR terminal operator to select one or more values determined utilizing output of the EIR terminal input devices as the search arguments for retrieving the list of video files from a video database. In a further aspect, the search arguments can be built using the tags of a video file being recorded or played back by the EIR terminal at the time of compiling the video file search request. An EIR terminal operator can be prompted to select one or more EIR terminal information input devices by selecting one or more checkboxes 402a, 402b, 402c. Upon completing the selection, the operator can initiate search by pressing the Search button 403, or cancel the operation by pressing the Cancel button 404.

Responsively to receiving a video file search request, the video content management server can search a video database and transmit to the EIR terminal a response including a list of video files satisfying the search conditions. FIG. 4c illustrates a sample user interface prompting an EIR terminal operator to select a video file to download and view from the list 410 of video files satisfying the search conditions. Upon completing the selection, the operator can initiate a download operation by pressing the Download button 412, or cancel the operation by pressing the Cancel button 414.

In another aspect, the metadata tags within the video stream being recorded can be monitored by the recording EIR terminal and/or by a remote server in communication with the recording EIR terminal, and if one or more metadata tags satisfy a triggering condition, one or more actions can be performed by the remote server and/or by the recording EIR terminal. The triggered actions can include, e.g., displaying a message to the EIR terminal operator, or changing one or more video content management server or video playback client network addresses to which the video stream being recorded is being delivered.

In a further aspect, the video content management server can monitor metadata tags in a video file being uploaded by the recording EIR terminal, and conditionally, upon one or more metadata tags satisfying one or more pre-defined triggering conditions, transmit a message to the recording EIR terminal operator. A triggering condition can be, e.g., an invalid bar code, or an invalid GPS location for an item being delivered.

In a further aspect, the recording EIR terminal can select a network address of a server to which the video file being recorded should be transmitted, from a table mapping the range of the values determined utilizing output of one or more EIR terminal input devices to one or more video content management server network addresses. In one example, the server network address table can include one or more entries mapping the range of the GPS positions (or the street addresses derived therefrom) of the recording EIR terminal to one or more video content management server network addresses, so that the recording EIR terminal can add, delete or replace a server network address to which the video file is being delivered, conditionally upon the recording EIR terminal changing its GPS position. In another example, the server network address table can include one or more entries mapping the value of a bar code or an RFID tag inputted by the EIR terminal to one or more video content management server network addresses, so that the recording EIR terminal can add, delete or replace a server address to which the video file is being delivered, depending upon the decoded message data produced by an EIR device.

In another aspect, the recording EIR terminal can transmit a video file with meta-data tags to a pre-defined server (e.g., the local server 162a) which can monitor the metadata tags and forward the video file to one or more content management servers or video playback clients whose network addresses are selected from a table mapping the range of the values of the metadata tags to one or more network addresses of content management servers or video playback clients. In one example, the metadata tags can include the GPS coordinates of the recording EIR terminal, so that the local server 162a can add, delete or replace a network address to which the recorded video file is being delivered, conditionally upon the recording EIR terminal changing its GPS position. In another example, the metadata tags can include the decoded message data produced by an EIR device, so that the local server 162a can add, delete or replace a network address to which the recorded video file is being delivered, depending upon the decoded message data produced by an EIR device. In a further example, the metadata tags can include one or more voice-to-text converted strings, so that the local server 162a can add, delete or replace a network address to which the recorded video file is being delivered, depending upon the contents of the EIR terminal operator's voice commands.

In another aspect, the contents of the metadata tags can be used by a video playback application or a video content management server receiving the video file to facilitate the processing of the file. In one example, the recording EIR terminal can capture one or more video frames containing an image of a package being shipped, insert metadata tags containing the imager type, the ambient light intensity, and the imaging parameters (e.g., the exposure level, the depth of field, the frame rate), and supply the video file as an input parameter to a package dimensioning software application being executed by a video content management server or a playback client. The package dimensioning application can analyze the captured video frames or formatted video stream, and the corresponding imaging parameters, compare the captured image to a plurality of stored images, and return the package dimensions which can be used by shipment management applications.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more said captured video frames into a video file, and create one or more metadata tags, at least one of said one or more metadata tags containing information other than information determined by processing of said one or more video frames, said video file selected from the group consisting of: a video image file, a video stream file.

A2. The portable EIR terminal of claim A1, wherein said video file is provided by a video stream file having a format selected from the group consisting of: MJPEG, MPREG-4, RealVideo, and WMV.

A3. The portable EIR terminal of claim A1, wherein said video file is provided by a video image file having a format selected from the group consisting of: JPEG, GIF, TIFF, and PNG.

A4. The portable EIR terminal of claim A1, wherein said one or more metadata tags are stored in one of: said video file, a data file different from said video file.

A5. The portable EIR terminal of claim A1, wherein said one or more metadata tags include said decoded message data.

A6. The portable EIR terminal of claim A1, wherein said one or more metadata tags include GPS coordinates of said EIR terminal.

A7. The portable EIR terminal of claim A1, wherein said one or more metadata tags include a street address derived from GPS coordinates of said EIR terminal.

A8. The portable EIR terminal of claim A1, wherein said one or more metadata tags include a text string representing a voice command, said voice command being issued by an operator of said terminal.

A9. The portable EIR terminal of claim A1, wherein said one or more metadata tags include a time stamp outputted by said real-time clock.

A10. The portable EIR terminal of claim A1 further including a user interface, said user interface allowing an operator of said terminal to enter at least one text string, wherein said one or more metadata tags include said at least one text string.

A11. The portable EIR terminal of claim A1, wherein said one or more metadata tags include at least one imaging parameter.

A12. The portable EIR terminal of claim A1, wherein said one or more metadata tags include an imaging parameter, said at least one imaging parameter selected from the group consisting of: an exposure level, a depth of field, a frame rate.

A13. The portable EIR terminal of claim A1, wherein said one or more metadata tags further comprise at least one metadata tag containing a text string, said text string selected from the group consisting of: a text string entered by an operator of said EIR terminal; a text string representing a voice command, said voice command being issued by an operator of said terminal.

A14. The portable EIR terminal of claim A1 further including an information input device selected from the group consisting of: a Global Positioning System (GPS) module, a voice recognition module, an ambient light luminous intensity sensor, a real-time clock, and a biometric information input device; and
wherein said metadata tags include information outputted by said information input device.

A15. The portable EIR terminal of claim A1 operating in a data collection system including a video content management server;
wherein said EIR terminal is further configured to transmit at least a portion of said video file to said video content management server via said at least one communication interface.

A16. The portable EIR terminal of claim A1 operating in a data collection system including a video content management server and a database;
wherein said EIR terminal is further configured, responsively to a user interface action specifying one or more video file search conditions, to transmit a video file search request to said video content management server.

A17. The portable EIR terminal of claim A1 operating in a data collection system including a video content management server and a database;
wherein said EIR terminal is further configured to transmit, in a fully automated mode, a video file search request to said video content management server.

A18. The portable EIR terminal of claim A1 operating in a data collection system including a video content management server and a database;
wherein said EIR terminal is further configured to transmit a video file search request to said video content management server; and
wherein said EIR terminal is further configured, responsively to receiving a response from said server, to display a list of video files satisfying said one or more video file search conditions.

A19. The portable EIR terminal of claim A1 operating in a data collection system including a video content management server and a database;
wherein said EIR terminal is further configured to transmit a video file search request to said video content management server; and
wherein at least one of said one or more video file search conditions include a parameter and a value of said parameter, at least one said parameter value determined utilizing output of an information input device of said EIR terminal.

A20. The portable EIR terminal of claim A1 operating in a data collection system including a video content management server and a database;
wherein said EIR terminal is further configured to transmit a video file search request to said video content management server;
wherein at least one of said one or more video file search conditions include a parameter and a value of said parameter, at least one said parameter value determined utilizing output of an information input device of said EIR terminal, said information input device selected from the group consisting of: an EIR device, a Global Positioning System (GPS) module, a voice recognition module, an ambient light luminous intensity sensor, real-time clock, and a biometric information input device.

A21. The portable EIR terminal of claim A1 operating in a data collection system including a video content management server and a database;
wherein said EIR terminal is further configured to transmit a video file search request to said video content management server; and
wherein at least one of said one or more video file search conditions include a parameter and a value of said parameter, at least one said parameter value provided by said decoded message data.

A22. The portable EIR terminal of claim A1 operating in a data collection system including a video content management server and a database;
wherein said EIR terminal is further configured to transmit a video file search request to said video content management server; and
wherein at least one of said one or more video file search conditions include a parameter and a value of said parameter, at least one said parameter value provided by an imaging parameter.

A23. The portable EIR terminal of claim A1 operating in a data collection system including a video content management server and a database;
wherein said EIR terminal is further configured to transmit a video file search request to said video content management server; and
wherein at least one of said one or more video file search conditions include a parameter and a value of said parameter, at least one said parameter value provided by an imaging parameter, said imaging parameter selected from the group consisting of: an exposure level, a depth of field, a frame rate.

A24. The portable EIR terminal of claim A1 operating in a data collection system including a video content managing server and a database;
wherein said EIR terminal is further configured to transmit a video file search request to said video content managing server; and
wherein at least one of said one or more video file search conditions include a parameter and a value of said parameter, at least one said parameter value provided by a metadata tag of a video file being recorded by said EIR terminal at the time of compiling said video file search request.

A27. The portable EIR terminal of claim A1 operating in a data collection system including a video content managing server and a database;
wherein said EIR terminal is further configured to transmit a video file search request to said video content managing server; and
wherein at least one of said one or more video file search conditions include a parameter and a value of said parameter, at least one said parameter value provided by a metadata tag of a video file being played back by said EIR terminal at the time of compiling said video file search request.

A28. The portable EIR terminal of claim A1 operating in a data collection system including two or more video content management servers;
wherein said EIR terminal is further configured to maintain in said memory a table, each entry of said table mapping a range of values determined utilizing output of an EIR terminal information input device to one or more video content management server network addresses.

A29. The portable EIR terminal of claim A1 operating in a data collection system including two or more video content management servers;
wherein said EIR terminal is further configured to maintain in said memory a table, each entry of said table mapping a range of values determined utilizing output of an EIR terminal input device to one or more video content management server network addresses, said information input device selected from the group consisting of: an EIR device, a Global Positioning System (GPS) module, a voice recognition module, an ambient light luminous intensity sensor, a real-time clock, and a biometric information input device.

B1. A data collection system comprising:
   at least one portable EIR terminal, said EIR terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;
   at least one video content management server communicatively coupled to said EIR terminal;
   wherein said EIR terminal is configured to capture one or more video frames, store said captured one or more video frames in said memory, transform one or more said captured video frames into a video file, and insert one or more metadata tags into said video file, said video file selected from the group consisting of a video image file, a video stream file; and
   wherein said EIR terminal is further configured to transmit at least a portion of said video file to said at least one video content management server via said at least one communication interface.

B2. The data collection system of claim B1, wherein said at least one video content management server is communicatively coupled to a database, said database storing a plurality of video files; and
   wherein said at least one video content management server is configured to store said at least a portion of said video file in said database.

B3. The data collection system of claim B1, wherein said at least one video content management server is communicatively coupled to a database, said database storing a plurality of video files; and
   wherein said at least one video content management server is configured to store said at least a portion of said video file in said database, said database indexed using said metadata tags.

B4. The data collection system of claim B1, wherein said metadata tags within said video file are monitored by at least one of said EIR terminal, said at least one video content management server; and
   wherein conditionally, upon one or more said metadata tags satisfying a triggering condition, an action is performed by at least one of said EIR terminal, said at least one video content management server.

B5. The data collection system of claim B1, wherein said metadata tags within said video file are monitored by at least one of said EIR terminal, said at least one video content management server;
   wherein conditionally, upon one or more said metadata tags satisfying a triggering condition, a message to an operator of said EIR terminal is displayed by one of said EIR terminal, said remote server.

B6. The data collection system of claim B1, wherein said metadata tags within said video file are monitored by at least one of said EIR terminal, said at least one video content management server;
   wherein conditionally, upon one or more said metadata tags satisfying a triggering condition, one of: said EIR terminal, said at least one video content management server changes a network address of one of: a video content management server to which said video file is being delivered, a video playback client to which said video file is being delivered.

B7. The data collection system of claim B1, wherein said metadata tags within said video file are monitored by at least one of said EIR terminal, said at least one video content management server;
   wherein at least one of: said EIR terminal, said video content management server is further configured to maintain a table; each entry of said table mapping a range of values determined utilizing output of an EIR terminal input device to a network address; and
   wherein conditionally, upon one or more said metadata tags satisfying a triggering condition, one of: said EIR terminal, said at least one video content management server changes a network address of one of: a video content management server to which said video file is being delivered, a video playback client to which said video file is being delivered.

B8. The data collection system of claim B1, wherein said metadata tags within said video file are monitored by at least one of said EIR terminal, said at least one video content management server;
   wherein at least one of: said EIR terminal, said video content management server is further configured to maintain a table, each entry of said table mapping a range of values produced by a GPS module of said EIR terminal to a network address; and
   wherein conditionally, upon one or more said metadata tags satisfying a triggering condition, one of: said EIR terminal, said at least one video content management server changes a network address of one of: a video content management server to which said video file is being delivered, a video playback client to which said video file is being delivered.

B9. The data collection system of claim B1, wherein said metadata tags within said video file are monitored by at least one of: said EIR terminal, said at least one video content management server;
   wherein at least one of: said EIR terminal, said video content management server is further configured to maintain a table; each entry of said table mapping a range of values produced by an EIR terminal voice recognition module to a network address; and
   wherein conditionally, upon one or more said metadata tags satisfying a triggering condition, one of: said EIR terminal, said at least one video content management server changes a network address of one of: a video content management server to which said video file is being delivered, a video playback client to which said video file is being delivered.

B10. The data collection system of claim B1, wherein said metadata tags within said video file are monitored by at least one of said EIR terminal, said at least one video content management server;
   wherein conditionally, upon detecting that one or more said metadata tags contain an invalid decoded message data, an action is performed by at least one of said EIR terminal, said at least one video content management server.

B11. The data collection system of claim B1, wherein said metadata tags within said video file are monitored by at least one of said EIR terminal, said at least one video content management server;
   wherein conditionally, upon detecting that one or more said metadata tags contain an invalid GPS location, an action is performed by at least one of said EIR terminal, said at least one video content management server.

B12. The data collection system of claim B1, wherein said metadata tags within said video file are used by said at least one video content management server to facilitate processing said video file.

B13. The data collection system of claim B1, wherein said metadata tags within said video file are used by a package dimensioning software application.

C1. A data collection system comprising:
at least one portable EIR terminal, said at least one terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;
at least one video content management server communicatively coupled to said at least one EIR terminal;
wherein said at least one EIR terminal is configured to capture one or more video frames, store said captured one or more video frames in said memory, transform one or more said captured video frames into a video file, and insert one or more metadata tags into said video file, said video file selected from the group consisting of a video image file, a video stream file;
wherein said one or more metadata tags include at least one imaging parameter; and
wherein said at least one EIR terminal is further configured to transmit at least a portion of said video file to said at least one video content management server via said at least one communication interface.

C2. The data collection system of claim C1, wherein said at least one imaging parameter is selected from the group consisting of: an exposure level, a depth of field, a frame rate.

D1. A method of video information search and retrieval by an encoded information reading (EIR) terminal executing a video playback software application, said EIR terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; at least one communication interface; said method comprising the steps of:
compiling a video file search request comprising one or more video file search conditions, at least one of said one or more video file search conditions including a parameter and a value of said parameter, at least one of said parameters specified via a user input accepted via a user interface;
transmitting said video file search request to a video content management server; and
receiving a response from said video content management server.

D2. The method of claim D1, wherein at least one of said one or more parameter values is specified via a user input accepted via a user interface.

D3. The method of claim D1, wherein at least one of said one or more parameter values is provided by said decoded message data.

D4. The method of claim D1, wherein at least one of said one or more parameter values is provided by an imaging parameter.

D5. The method of claim D1, wherein at least one of said one or more parameter values is provided by an imaging parameter, said at least one imaging parameter selected from the group consisting of: an exposure level, a depth of field, a frame rate.

D6. The method of claim D1, wherein at least one of said one or more parameter values is outputted by an information input device of said EIR terminal.

D7. The method of claim D1, wherein at least one of said one or more parameter values is outputted by an information input device of said EIR terminal, said information input device selected from the group consisting of: an EIR device, a GPS module, a voice recognition module, am ambient light luminous intensity sensor, a real-time clock, and a biometric information input device.

D8. The method of claim D1, wherein at least one of said one or more parameter values is provided by a metadata tag of a video file being recorded by said EIR terminal at the time of compiling said video file search request.

D9. The method of claim D1, wherein at least one of said one or more parameter values is provided by a metadata tag of a video file being played back by said EIR terminal at the time of compiling said video file search request.

D10. The method of claim D1, wherein said response from said video content management server includes a list of video files satisfying said video file search conditions;
wherein said method further comprises the steps of:
displaying said list of video files; and
accepting user input via said user interface, said user input specifying a video file to be downloaded by said EIR terminal from said video content management server.

E1. A data collection system comprising:
at least one portable EIR terminal, said terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;
at least one video content management server communicatively coupled to said at least one EIR terminal;
wherein said at least one EIR terminal is configured to capture one or more video frames, store said captured one or more video frames in said memory, transform one or more said captured video frames into a video file, and insert one or more metadata tags into said video file, said video file selected from the group consisting of a video image file, a video stream file;
wherein said one or more metadata tags include at least one metadata tag containing information outputted by an information input device of said at least one EIR terminal; and wherein said one or more metadata tags further comprise at least one metadata tag containing a text string, said text string selected from the group consisting of: a text string entered by an operator of said at least one EIR terminal; a text string representing a voice command, said voice command being issued by an operator of said terminal; and said at least one EIR terminal is further configured to transmit at least a portion of said video file to said at least one video content management server via said at least one communication interface.

E2. The data collection system of claim E1, wherein said information input device is selected from the group consisting of: an EIR device, a Global Positioning System (GPS) module, a voice recognition module, an ambient light luminous intensity sensor, a real-time clock, and a biometric information input device.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

We claim:

1. A method of video information search and retrieval by an encoded information reading (EIR) terminal executing a video playback software application, said EIR terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; at least one communication interface; said method comprising the steps of:

compiling a video file search request comprising one or more video file search conditions, at least one of said one or more video file search conditions including a parameter and a value of said parameter, wherein said one or more video file search conditions includes at least one parameter specified via a user input accepted via a user interface;

transmitting said video file search request to a video content management server; and receiving a response from said video content management server.

2. The method of claim 1, wherein said one or more video file search conditions includes a parameter value specified via a user input accepted via a user interface.

3. The method of claim 1, wherein said one or more video file search conditions includes a parameter value provided by said decoded message data.

4. The method of claim 1, wherein said one or more video file search conditions includes a parameter value provided by an imaging parameter.

5. The method of claim 1, wherein said one or more video file search conditions includes a parameter value provided by an imaging parameter, said at least one imaging parameter selected from the group consisting of: an exposure level, a depth of field, a frame rate.

6. The method of claim 1, wherein said one or more video file search conditions includes a parameter value outputted by an information input device of said EIR terminal.

7. The method of claim 1, wherein said one or more video file search conditions includes a parameter value outputted by an information input device of said EIR terminal, said information input device selected from the group consisting of: an EIR device, a GPS module, a voice recognition module, am ambient light luminous intensity sensor, a real-time clock, and a biometric information input device.

8. The method of claim 1, wherein said one or more video file search conditions includes a parameter value is provided by a metadata tag of a video file being recorded by said EIR terminal at the time of compiling said video file search request.

9. The method of claim 1, wherein said one or more video file search conditions includes a parameter value provided by a metadata tag of a video file being played back by said EIR terminal at the time of compiling said video file search request.

10. The method of claim 1, wherein said response from said video content management server includes a list of video files satisfying said video file search conditions;

wherein said method further comprises the steps of:

displaying said list of video files; and accepting user input via said user interface, said user input specifying a video file to be downloaded by said EIR terminal from said video content management server.

11. A data collection system comprising:

at least one portable EIR terminal, said terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;

at least one video content management server communicatively coupled to said at least one EIR terminal;

wherein said at least one EIR terminal is configured to capture one or more video frames, store said captured one or more video frames in said memory, transform one or more of said captured video frames into a video file, and insert one or more metadata tags into said video file, said video file selected from the group consisting of a video image file, a video stream file;

wherein said one or more metadata tags include at least one metadata tag containing information outputted by an information input device of said at least one EIR terminal; and wherein said one or more metadata tags further comprise at least one metadata tag containing a text string, said text string selected from the group consisting of: a text string entered by an operator of said at least one EIR terminal; a text string representing a voice command, said voice command being issued by an operator of said terminal; and said at least one EIR terminal is further configured to transmit at least a portion of said video file to said at least one video content management server via said at least one communication interface.

12. The data collection system of claim 11, wherein said information input device is selected from the group consisting of: an EIR device, a Global Positioning System (GPS) module, a voice recognition module, an ambient light luminous intensity sensor, a real-time clock, and a biometric information input device.

13. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file
wherein said one or more metadata tags include GPS coordinates of said EIR terminal.

14. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file;
wherein said one or more metadata tags include a street address derived from GPS coordinates of said EIR terminal.

15. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file;
wherein said one or more metadata tags include a text string representing a voice command, said voice command being issued by an operator of said terminal.

16. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file;
wherein said one or more metadata tags include a time stamp outputted by said real-time clock.

17. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;

a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file;
wherein said EIR terminal includes a user interface, said user interface allowing an operator of said terminal to enter at least one text string, wherein said one or more metadata tags include said at least one text string.

18. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file;
wherein said one or more metadata tags include at least one imaging parameter.

19. The portable encoded information reading (EIR) terminal of claim 18, wherein said at least one imaging parameter is selected from the group consisting of: an exposure level, a depth of field, a frame rate.

20. The portable encoded information reading (EIR) terminal of claim 18, wherein said at least one imaging parameter includes an exposure level.

21. The portable encoded information reading (EIR) terminal of claim 18, wherein said at least one imaging parameter includes a depth of field.

22. The portable encoded information reading (EIR) terminal of claim 18, wherein said at least one imaging parameter includes a frame rate.

23. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file;
wherein said one or more metadata tags further comprise at least one metadata tag containing a text string, said text string selected from the group consisting of: a text string entered by an operator of said EIR terminal; a text string representing a voice command, said voice command being issued by an operator of said terminal.

24. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file;
wherein said EIR terminal includes an information input device selected from the group consisting of: a Global Positioning System (GPS) module, a voice recognition module, an ambient light luminous intensity sensor, a real-time clock, and a biometric information input device; and wherein said metadata tags include information outputted by said information input device.

25. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file;
wherein said EIR terminal is configured to operate in a data collection system including a video content management server and a database, wherein said EIR terminal is further configured to transmit a video file search request to said video content management server.

26. The portable EIR terminal of claim 25, wherein said EIR terminal is configured, responsively to a user interface action specifying one or more video file search conditions, to transmit a video file search request to said video content management server.

27. The portable EIR terminal of claim 25, wherein said EIR terminal is configured to transmit, in a fully automated mode, a video file search request to said video content management server.

28. The portable EIR terminal of claim 25, wherein said EIR terminal is configured, responsively to receiving a response from said server, to display a list of video files satisfying said one or more video file search conditions.

29. The portable EIR terminal of claim 25, wherein said video file search request comprises a parameter value determined utilizing output of an information input device of said EIR terminal.

30. The portable EIR terminal of claim 25, wherein said video file search request comprises a parameter value determined utilizing output of an information input device of said EIR terminal, said information input device selected from the group consisting of: an EIR device, a Global Positioning System (GPS) module, a voice recognition module, an ambient light luminous intensity sensor, real-time clock, and a biometric information input device.

31. The portable EIR terminal of claim 25, wherein said video file search request comprises a parameter value provided by said decoded message data.

32. The portable EIR terminal of claim 25, wherein said video file search request comprises an imaging parameter.

33. The portable EIR terminal of claim 25, wherein said video file search request comprises an imaging parameter selected from the group consisting of: an exposure level, a depth of field, a frame rate.

34. The portable EIR terminal of claim 25, wherein said video file search request comprises a parameter value provided by a metadata tag of a video file being recorded by said EIR terminal at the time of compiling said video file search request.

35. The portable EIR terminal of claim 25, wherein said video file search request comprises a parameter value provided by a metadata tag of a video file being played back by said EIR terminal at the time of compiling said video file search request.

36. A portable encoded information reading (EIR) terminal, said terminal comprising:
a central processing unit (CPU);
a memory;
an imaging module including a two-dimensional image sensor and a lens assembly focusing an image onto said two-dimensional image sensor;
an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message;
a hand held housing incorporating said EIR device;
at least one communication interface;
wherein said EIR terminal is configured to capture one or more video frames, store said captured one or more video frames in said memory, transform one or more of said captured video frames into a video file, and create one or more metadata tags, at least one of said one or more metadata tags containing information other than information determined by processing of said one or more video frames, said video file selected from the group consisting of: a video image file, a video stream file;
wherein said EIR terminal is configured to operate in a data collection system including two or more video content management servers;
wherein said EIR terminal is configured to maintain in said memory a table, wherein a plurality of entries of said table map a range of values determined utilizing output of an EIR terminal information input device to one or more video content management server network addresses.

37. The portable encoded information reading (EIR) terminal of claim 36, wherein said information input device is selected from the group consisting of: an EIR device, a Global Positioning System (GPS) module, a voice recognition module, an ambient light luminous intensity sensor, a real-time clock, and a biometric information input device.

38. A data collection system comprising:
at least one portable EIR terminal, said EIR terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;
at least one video content management server communicatively coupled to said EIR terminal;
wherein said EIR terminal is configured to capture one or more video frames, store said captured one or more video frames in said memory, transform one or more said captured video frames into a video file, and insert one or more metadata tags into said video file, said video file selected from the group consisting of a video image file, a video stream file; and
wherein said EIR terminal is further configured to transmit at least a portion of said video file to said at least one video content management server via said at least one communication interface;

wherein said metadata tags within said video file are monitored by one or more of said EIR terminal and said at least one video content management server;

wherein conditionally, upon one or more said metadata tags satisfying a triggering condition, one or more of said EIR terminal and said at least one video content management server changes a network address of one of: a video content management server to which said video file is being delivered, a video playback client to which said video file is being delivered.

39. A data collection system comprising:

at least one portable EIR terminal, said EIR terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;

at least one video content management server communicatively coupled to said EIR terminal;

wherein said EIR terminal is configured to capture one or more video frames, store said captured one or more video frames in said memory, transform one or more said captured video frames into a video file, and insert one or more metadata tags into said video file, said video file selected from the group consisting of a video image file, a video stream file; and wherein said EIR terminal is further configured to transmit at least a portion of said video file to said at least one video content management server via said at least one communication interface;

wherein said metadata tags within said video file are monitored by one or more of said EIR terminal and said at least one video content management server;

wherein one or more of said EIR terminal and said video content management server are configured to maintain a table, wherein a plurality of entries of said table map a range of values determined utilizing output of an EIR terminal input device to a network address; and wherein conditionally, upon one or more said metadata tags satisfying a triggering condition, one or more of said EIR terminal and said at least one video content management server changes a network address of one of: a video content management server to which said video file is being delivered, a video playback client to which said video file is being delivered.

40. A data collection system comprising:

at least one portable EIR terminal, said EIR terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;

at least one video content management server communicatively coupled to said EIR terminal;

wherein said EIR terminal is configured to capture one or more video frames, store said captured one or more video frames in said memory, transform one or more said captured video frames into a video file, and insert one or more metadata tags into said video file, said video file selected from the group consisting of a video image file, a video stream file; and wherein said EIR terminal is further configured to transmit at least a portion of said video file to said at least one video content management server via said at least one communication interface;

wherein said metadata tags within said video file are monitored by one or more of said EIR terminal and said at least one video content management server;

wherein one or more of said EIR terminal and said video content management server are configured to maintain a table, wherein a plurality of entries of said table map a range of values produced by a GPS module of said EIR terminal to a network address; and wherein conditionally, upon one or more said metadata tags satisfying a triggering condition, one or more of said EIR terminal and said at least one video content management server change a network address of one of: a video content management server to which said video file is being delivered, a video playback client to which said video file is being delivered.

41. A data collection system comprising:

at least one portable EIR terminal, said EIR terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;

at least one video content management server communicatively coupled to said EIR terminal;

wherein said EIR terminal is configured to capture one or more video frames, store said captured one or more video frames in said memory, transform one or more said captured video frames into a video file, and insert one or more metadata tags into said video file, said video file selected from the group consisting of a video image file, a video stream file; and wherein said EIR terminal is further configured to transmit at least a portion of said video file to said at least one video content management server via said at least one communication interface;

wherein said metadata tags within said video file are monitored by one or more of said EIR terminal and said at least one video content management server;

wherein one or more of said EIR terminal and said video content management server is further configured to maintain a table, wherein a plurality of entries of said table map a range of values produced by an EIR terminal voice recognition module to a network address; and wherein conditionally, upon one or more said metadata tags satisfying a triggering condition, one or more of said EIR terminal and said at least one video content management server changes a network address of one of: a video content management server to which said video file is being delivered, a video playback client to which said video file is being delivered.

42. A data collection system comprising:

at least one portable EIR terminal, said EIR terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;

at least one video content management server communicatively coupled to said EIR terminal;

wherein said EIR terminal is configured to capture one or more video frames, store said captured one or more video frames in said memory, transform one or more said captured video frames into a video file, and insert one or more metadata tags into said video file, said video file selected from the group consisting of a video image file, a video stream file; and wherein said EIR terminal is further configured to transmit at least a portion of said video file to said at least one video content management server via said at least one communication interface;

wherein said metadata tags within said video file are monitored by one or more of said EIR terminal and said at least one video content management server;

wherein conditionally, upon detecting that one or more said metadata tags contain an invalid decoded message data, an action is performed by one or more of said EIR terminal and said at least one video content management server.

43. A data collection system comprising:

at least one portable EIR terminal, said EIR terminal including a central processing unit (CPU); a memory; an imaging module having a two-dimensional image sensor and a lens assembly focusing an image onto said two-dimensional image sensor; an EIR device selected from the group consisting of: a bar code reading device employing said imaging module, an RFID reading device, and a card reading device, said EIR device configured to perform one of: outputting raw message data containing an encoded message, outputting decoded message data corresponding to an encoded message; a hand held housing incorporating said EIR device, said image sensor, and said lens assembly; at least one communication interface;

at least one video content management server communicatively coupled to said EIR terminal;

wherein said EIR terminal is configured to capture one or more video frames, store said captured one or more video frames in said memory, transform one or more said captured video frames into a video file, and insert one or more metadata tags into said video file, said video file selected from the group consisting of a video image file, a video stream file; and wherein said EIR terminal is further configured to transmit at least a portion of said video file to said at least one video content management server via said at least one communication interface;

wherein said metadata tags within said video file are monitored by one or more of said EIR terminal and said at least one video content management server;

wherein conditionally, upon detecting that one or more said metadata tags contain an invalid GPS location, an action is performed by one or more of said EIR terminal and said at least one video content management server.

* * * * *